United States Patent
Stednitz

(10) Patent No.: US 9,759,364 B2
(45) Date of Patent: Sep. 12, 2017

(54) ARMORED HOSE ASSEMBLY

(71) Applicant: Strahman Valves, Inc., Bethlehem, PA (US)

(72) Inventor: Samuel Gregory Stednitz, St. Clair, PA (US)

(73) Assignee: Straham Valves, Inc., Bethlehem, PA (US)

( * ) Notice: Subject to any disclaimer, the term of this patent is extended or adjusted under 35 U.S.C. 154(b) by 50 days.

(21) Appl. No.: 14/160,302

(22) Filed: Jan. 21, 2014

(65) Prior Publication Data

US 2014/0203549 A1    Jul. 24, 2014

Related U.S. Application Data

(60) Provisional application No. 61/755,435, filed on Jan. 22, 2013.

(51) Int. Cl.
| | |
|---|---|
| *F16L 33/01* | (2006.01) |
| *F16L 11/08* | (2006.01) |
| *F16L 33/28* | (2006.01) |
| *F16L 33/22* | (2006.01) |

(52) U.S. Cl.
CPC .............. *F16L 33/01* (2013.01); *F16L 11/085* (2013.01); *F16L 33/28* (2013.01); *F16L 33/223* (2013.01)

(58) Field of Classification Search
CPC ........ F16L 11/085; F16L 11/086; F16L 11/20; F16L 33/223; F16L 33/28; F16L 33/01
USPC ............ 285/256, 222.1–222.5, 354; 138/124
See application file for complete search history.

(56) References Cited

U.S. PATENT DOCUMENTS

| | | | | |
|---|---|---|---|---|
| 994,861 | A * | 6/1911 | Miller ........................ | 285/222.2 |
| 4,089,351 | A * | 5/1978 | Ward et al. ................... | 138/109 |
| 4,295,496 | A * | 10/1981 | Bixby ........................... | 138/122 |
| 4,295,672 | A * | 10/1981 | Williams ................ | F16L 33/28 |
| | | | | 228/132 |
| 4,431,031 | A * | 2/1984 | Ettlinger ....................... | 138/109 |
| 4,906,030 | A * | 3/1990 | Yokomatsu ............. | F16L 33/16 |
| | | | | 285/101 |
| 5,330,236 | A * | 7/1994 | Peterjohn ................ | F16L 33/32 |
| | | | | 285/222.2 X |
| 8,523,239 | B2 * | 9/2013 | Jung ..................... | F16L 19/028 |
| | | | | 285/222.1 X |
| 2008/0110519 | A1 * | 5/2008 | Gorilovskiy et al. ........ | 138/141 |
| 2009/0032164 | A1 * | 2/2009 | Halimi .................. | B29C 65/565 |
| | | | | 156/69 |

* cited by examiner

*Primary Examiner* — Gregory Binda
*Assistant Examiner* — Zachary Dragicevich
(74) *Attorney, Agent, or Firm* — Graham Curtin, P.A.

(57) ABSTRACT

A hose assembly is provided having a bendable inner hose, a bendable outer hose, and a ferrule, wherein both the inner and outer hose are connected to the ferrule.

13 Claims, 2 Drawing Sheets

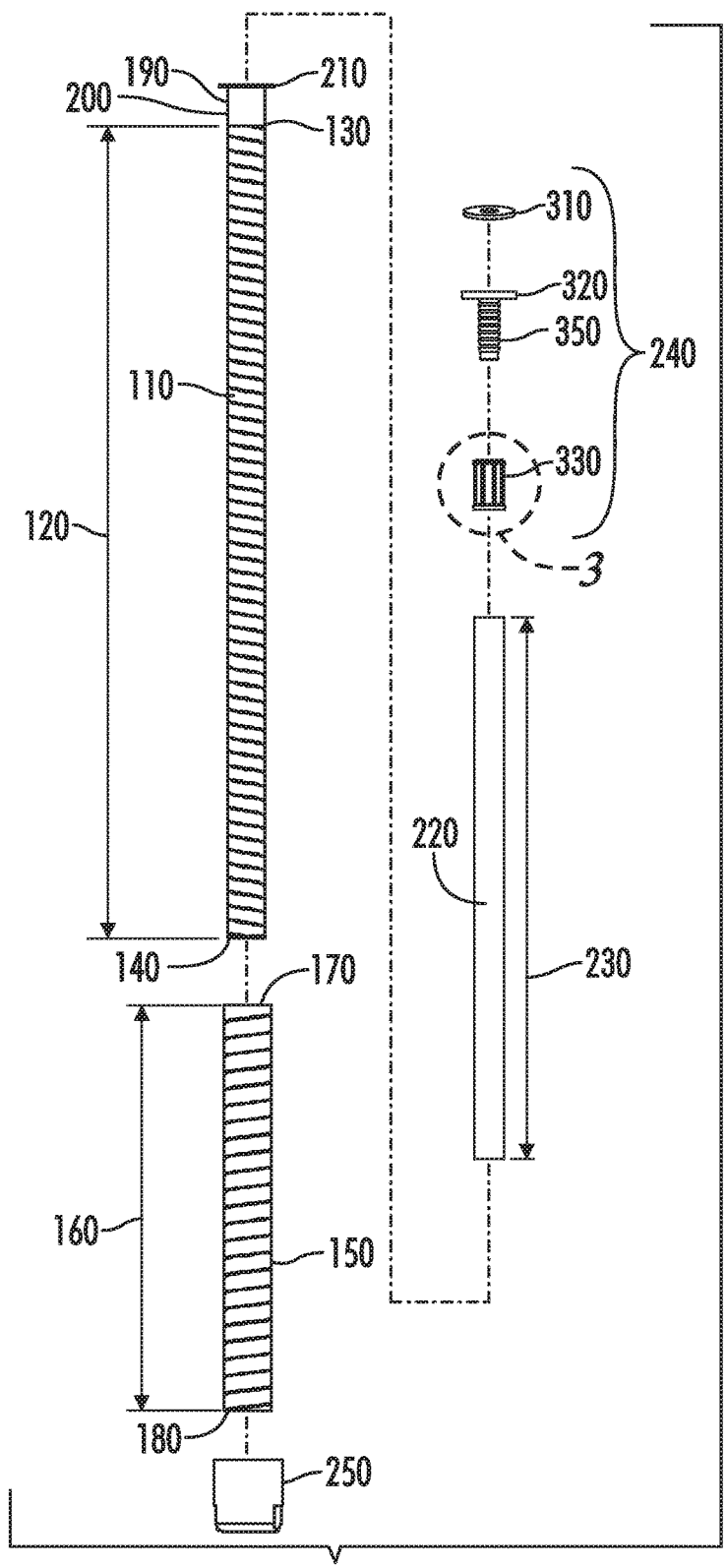
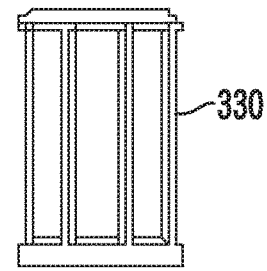
FIG. 2
FIG. 3

ARMORED HOSE ASSEMBLY

CROSS REFERENCE TO RELATED APPLICATIONS

The present application claims priority under 35 USC 119 to U.S. Provisional Patent Application No. 61/755,435, filed Jan. 22, 2013, the contents of which are incorporated herein by reference.

FIELD OF THE INVENTION

The present invention relates to hose assemblies in general, and more particularly to armored hose assemblies for use in commercial and industrial wash-down equipment.

BACKGROUND

Various types of hose assemblies are employed for the rinsing of dishes, pots, pans, and utensils in commercial and institutional settings, such as restaurant kitchens. Typically, the hose assemblies are mounted on or near sinks, and are manipulated manually by a person washing the items. Such hose assemblies convey fluid, generally water, from a source, typically a fitting installed in a wall, to a destination, typically a nozzle or sprayer assembly mounted on the end of the hose assembly. Often, the nozzle or sprayer assembly is suspended above a workspace, such as a sink, using a stiff spring, so that the sprayer can be grasped by a user, pulled towards the location at which it is needed, and then automatically returned to its suspended position after use.

In traditional hose assemblies, the hose assembly is fixed to a fitting installed at one end and a fitting for a nozzle or sprayer assembly at the other end using standard threaded couplings. In order to protect the hose assembly and provide some rigidity, an armored hose sheath often surrounds the hose and is secured in some way to the couplings connecting the hose to the fittings. Typically, the hose sheath is only superficially connected to the couplings, and as such the hose itself is fixed to the couplings. As such, it has been found that through repeated uses of such hose assemblies, the hose tends to fatigue and break at or near the coupling. When that happens, the hose assembly typically must be replaced. There is a need for a hose assembly having improved durability, particularly where it connects to a fitting using a coupling.

SUMMARY

In some embodiments, a hose assembly is provided having a bendable inner hose, a bendable outer hose, and a ferrule, wherein both the inner and outer hose are connected to the ferrule. The inner hose may be a hose spring, and the outer hose may be a hose sheath. In some embodiments, the ferrule has a body and a flange and the inner hose is connected to the ferrule at the body and the inner hose is connected to the ferrule at the flange. The ferrule may be preassembled to the inner hose, typically by welding, and may be fixed to the outer hose upon assembly of the remaining hose assembly. The outer hose may be fixed to the ferrule using, for example, silver soldering.

In some embodiments, one end of the outer hose may be fixed to the ferrule and the other end of the outer hose may be fixed to the outer surface of the inner hose. In such an embodiment, the outer hose may be shorter than the inner hose. In other embodiments, the inner hose may be shorter than the outer hose or both inner and outer hoses may be the same length. The hose assembly may further contain a delivery hose for delivering fluid disposed within the inner hose. The delivery hose may be longer than the inner hose, and may typically run from a source to a destination and have a length substantially equivalent to that of the longer of the inner and outer hoses. The delivery hose is typically disposed within the inner hose, and may combine with the inner hose to form a single armored hose. The delivery hose may be press fitted into the inner hose.

The hose assembly is typically connected to a source, such as a fitting, using a connector. The connector may be slidably placed onto the outer hose, and may connect to a fitting. The connector may then have a first opening, or bore, sized to accommodate a fitting, and a second opening, or bore, sized to accommodate the outer hose. The bore accommodating the outer hose typically will be smaller than the flange of the ferrule, so that the ferrule may be used to fix the hose assembly to the fitting, with a shoulder within the connector compressing the ferrule against the fitting. The bore sized to accommodate the fitting may be threaded to mate with the fitting, and the connector may rotate freely relative to the outer hose so that the connector may be tightened or loosened on the fitting without rotating the inner and outer hose.

BRIEF DESCRIPTION OF THE DRAWINGS

FIG. 2 is an exploded view of the embodiment of FIG. 1, detailing the construction of the hose assembly.

FIG. 3 is an enlarged view of a portion of FIG. 2.

DETAILED DESCRIPTION OF THE PREFERRED EMBODIMENTS

Figure 1:
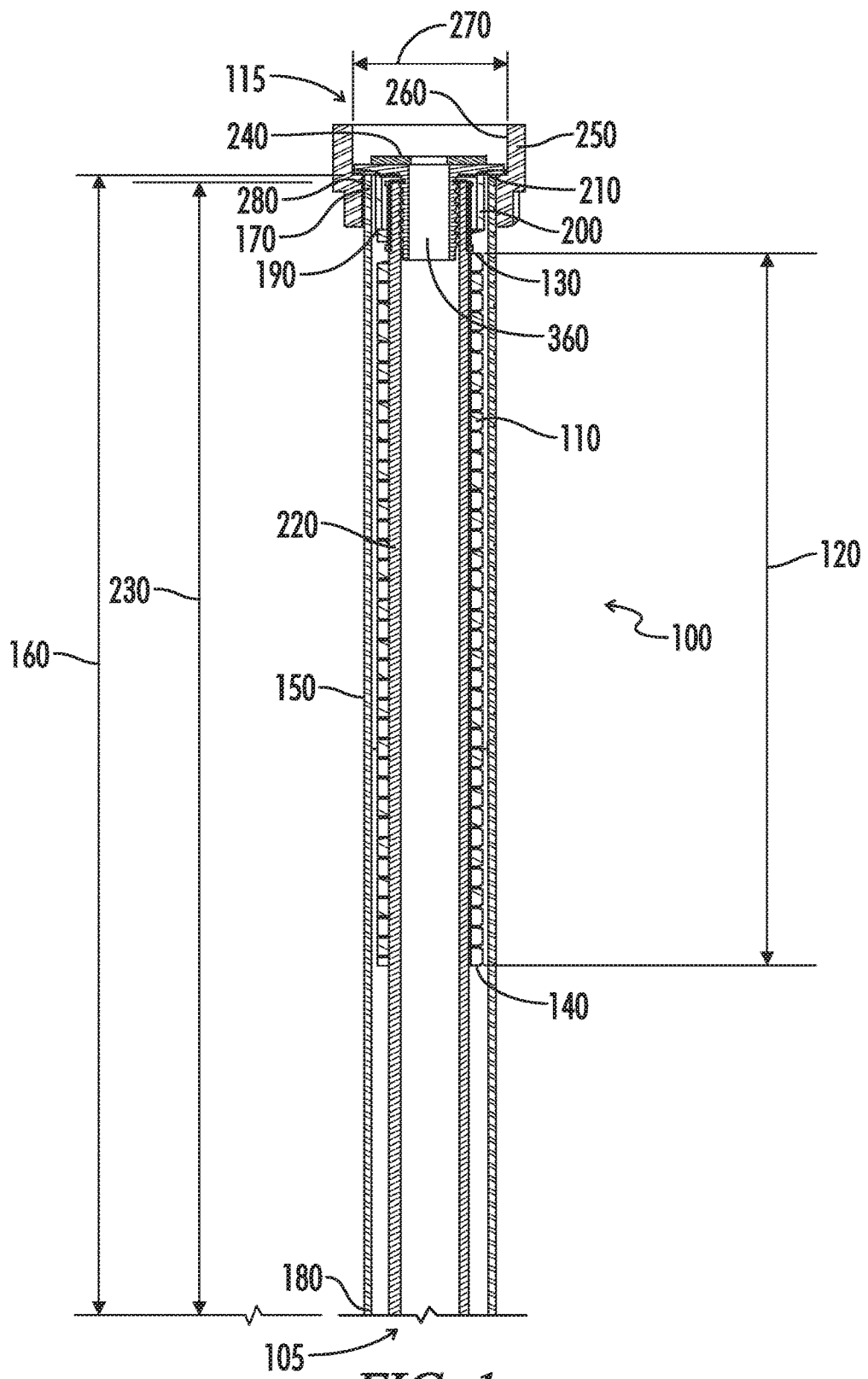
FIG. 1 is a sectioned view of one embodiment of a hose assembly according to the disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 shows a sectioned view of one embodiment of a hose assembly 100 according to the disclosure. The hose assembly 100 may be used to carry fluids from a source 105 to a destination 115, the fluids being, for example, gas, such as steam or liquid, such as water. The source 105 may be a fitting, and the destination 115 may be, for example, an end of the hose or a fluid discharge assembly, such as a nozzle.

The hose assembly 100 comprises a bendable inner hose 110 having a length 120 at rest, a first end 130, and a second end 140, a bendable outer hose 150, having a length 160 at rest, a third end 170, and a fourth end 180, and a ferrule 190 having a body 200 and a flange 210. When assembled, the bendable inner hose 110 is fixed to the ferrule body 200 by, for example, tack welding the first end 130 to the ferrule 190, and the outer hose is fixed to the ferrule flange 210 by, for example, silver soldering the third end 170 to the ferrule 190. It will be understood that various other fixation methods may be used. It will be further understood that the inner and outer hoses 110, 150 may both be fixed to either the body 200 or flange 210 of the ferrule 190 without diminishing the functionality of the assembly.

Once assembled, the inner hose 110 is disposed within the outer hose 150, and both are connected to the ferrule 190. In some embodiments, the length 120 of the inner hose 110 is approximately equal to the length 160 of the outer hose 150. In such an embodiment, the fourth end 180 of the outer hose may be attached to an outer surface of the inner hose 110 at approximately the second end 140 of the inner hose 110. In other embodiments, the length 120 of the inner hose 110 may be shorter or longer than the length 160 of the outer hose 150. In any event, the inner hose 110 and the outer hose 150 may be unconnected other than at an end of one of the hoses.

The bendable inner hose 110 may be a hose spring, and may encompass an inner conduit 220. Such an inner conduit 220 may be a delivery hose disposed within the bendable inner hose 110. In such an embodiment, the inner conduit 220 may be made of a flexible material, such as polyurethane, and the inner hose 110 may be a hose spring made of a metal. The inner conduit 220 and the inner hose 110 may then combine to form an armor-clad hose, which provides the durability of the inner hose 110 and the flexibility and waterproofing of the inner conduit 220. The inner conduit 220 may then carry fluid from the source 105 to the destination 115 within the hose assembly 100.

The inner hose 110 may have an expanded length which is greater than the length 120 at rest. Some variability in terms of length gives the inner hose 110 added flexibility when bending or stretching.

In the illustrated implementation, the length 120 of the inner hose 110 is less than the length 160 of the outer hose 150. The inner hose 110 then terminates within the outer hose 150. In such scenarios, the inner conduit 220 may have a third length 230 longer than the length 120 of the inner hose 110 and may continue to be disposed within the outer hose 150 for the length 160 of the outer hose. In other embodiments, the length 160 of the outer hose 150 may be smaller than the length 120 of the inner hose 110. In such an embodiment, the outer hose 150 may only provide protection for a portion of the length 120 of the inner hose 110.

The inner conduit 220 may carry liquid from the first end 130 of the inner hose 110 to the second end 140 of the inner hose 110 or the fourth end 180 of the outer hose 150. The inner conduit may therefore have a third length 230 that is substantially the same as the longer of the first length 120 and the second length 160. The inner conduit may terminate, along with the inner hose 110 or the outer hose 150, at a nozzle (not shown). In order to ensure that no water leaks between the inner conduit 220 and the inner hose 110, the inner conduit 220 may terminate at an interface unit 240 (FIG. 1) designed to interface with a fitting (not shown). The interface unit 240 may be press fitted into the inner conduit 220 and may be crimped or otherwise forced against the fitting to create a water tight seal using a connector 250. The interface unit 240 may be configured to interface with the ferrule 190 and the inner hose 110 to fully encompass the inner conduit 220 and form a durable seal.

The outer hose 150 may be a hose sheath or sleeve fully encasing the inner hose 110. The outer hose may therefore be made of coiled metal that has an expanded position and a contracted position wherein the length 160 varies depending on whether the outer house 150 is at rest or is expanded or bent. In the two positions, more or less overlapping metal in the form of scales is exposed. The outer hose 150 may be more flexible than the inner hose 110, so as to not restrict the flexibility of the inner hose when the inner hose is disposed within the outer hose. The added flexibility may be due to the use of a thinner and/or more pliable material, or it may be due to a more flexible configuration, or it may be due to the construction of the movable elements that form the outer hose 150. For example, the arrangement of the outer hose 150 as a sheathing having overlapping metal pieces may allow for more movement when bending the outer hose 150 to conform to some shape. Where the inner hose 110 is configured as a hose spring encompassing an inner conduit, the outer hose 150 will likely be more flexible than the inner hose 110. Similarly, the added flexibility may lead to the outer hose 150 having an expanded length substantially greater than the length 160 at rest of the hose. The outer hose 150 may therefore add durability and protect the inner hose 110, and in some implementations, the inner conduit 220 without reducing the flexibility of the assembly 100.

The ferrule 190 may have a body 200 in the form of a tube having a similar or substantially identical diameter to the inner hose 110. When fixed to the inner hose 110, the body 200 of the ferrule may be disposed coaxially with the inner hose 110, so that the body may act as an extension of the inner hose 110. In such an embodiment, the flange 210 has a diameter larger than that of the body 200, and therefore larger than that of the inner hose 110.

The hose assembly 100 may be fastened to a fitting (not shown) using the connector 250. In the illustrated embodiment, the connector 250 is substantially cylindrical, and is bored to two distinct interior diameters. A first bore 260 of the connector 250 having a first diameter 270 is configured to connect to the fitting, and a second bore 280 having a second diameter is configured to be disposed on the outer surface of the outer hose 150. The connector 250 is then slidably received on the outer hose 150, and encompasses the ferrule 190 in fixing the hose assembly 100 to the fitting. The first diameter 270 is therefore substantially identical to a diameter of a fitting and is larger than the diameter of the flange 210 of the ferrule 190. The first bore 260 may then be threaded to mate with the fitting, which may have corresponding threading. The second diameter is smaller than the first diameter 270 and is substantially similar to an outer diameter of the outer hose 150 and is smaller than the diameter of the flange 210 of the ferrule 190.

FIG. 2 shows an exploded view of the embodiment of FIG. 1, detailing the construction of the hose assembly 100, and FIG. 3 is an enlarged view of the portion of FIG. 2 labeled 3. Prior to formal assembly, in the illustrative embodiment, the ferrule 190 is fixed to the inner hose 110 by, for example, welding. The pieces of the assembly 100 then comprise the inner hose 110 (including the attached ferrule 190), the outer hose 150, the conduit 220, the connector 250, and the interface unit 240, comprising a washer 310, a plug 320 containing a channel 360 for allowing fluid to pass through, and a clamping element 330.

To construct the hose assembly 100, the interfacing unit 240 is first fixed to one end of the conduit 220. The clamping element 330 is first placed in position for clamping onto the plug 320 by sliding it over the end of the conduit 220. The plug 320, which contains barbs or ribbing 350 to improve its grip on the inside of the conduit 220, is then inserted into the end of the conduit. The clamping element 330 is then crimped or pressed onto the conduit 220 so that the plug 320 and the clamping unit combine to grasp the end of the conduit 220. The washer 310 is then maintained in place for creating an interface with a fitting.

The conduit 220 is then inserted into the inner hose 110 and configured so that the end of the conduit 220 containing the interfacing unit 240 terminates substantially at the first end 130 of the inner hose 110, and is contained within the body 200 of the ferrule 190. In some embodiments, the entire length of the inner hose 110 tightly abuts the inner conduit 220 encapsulated by the inner hose. In such embodiments, the length of the conduit 220 is extended into the inner hose 110 whereby the combination of the conduit 220 and the inner hose 110 can be treated as a single armored hose for the length of the inner hose 110.

After the inner hose 110 and conduit 220 are combined, the outer hose 150 is placed outside the inner hose 110 to form a protective sheathing. The third end 170 of the outer hose 150 is fixed to the ferrule 190 by, for example, silver soldering. In some embodiments, the inner hose 110 has a length 120 substantially shorter than the length 160 of the outer hose 150, so that the inner hose 110 is only partially inserted into the outer hose 150 before the outer hose can be fixed to the ferrule 190. In such an embodiment, the length of the conduit 220 may extend beyond the length of the inner hose 110 for the entire length of the outer hose 150, and may terminate at the end of the outer hose 150.

After assembling the inner hose 110, conduit 220, and outer hose 150, using the interfacing unit 240 and ferrule 190, the connector 250 (FIG. 1) is slidably placed on the outer surface of the outer hose 150. The connector 250 is slid down the length of the outer hose 250 and encompasses the ferrule 190 and the interfacing unit 240 while fixing to a fitting or a nozzle, for example. The first bore 260 of the connector 250 contains threading that engages threading on the fitting or nozzle to form a seal, and during installation, the threading may be used to tighten the assembly 100 and to compress the interfacing unit 240 against the fitting or nozzle. Because the connector 250 is slidably applied to the outer hose 150, the connector 250 is rotatable relative to the outer hose and may be tightened or loosened relative to the fitting or nozzle without rotating the rest of the assembly 100.

Once assembled, fluid is transmitted from the source 105 to the destination 115 by passing from the fitting through the washer 310 and the channel 360 of the plug 320, and the conduit 220 within the inner hose 110 and the outer hose 150. When in use, users grasp and pull the hose assembly 100 from the destination 115 end of the assembly in order to direct a nozzle or sprayer assembly as needed. When finished using the hose assembly 100, a spring (not shown) returns the hose assembly to a storage position until the hose assembly is needed again. This repeated motion exerts substantial stress on the hose assembly 100 near the connector 250 between the hose assembly 100 and the destination 115 of the fluid. Because of this repeated stress, traditional hose assemblies having an inner conduit acting as a delivery hose often fail near a connection to a nozzle or sprayer, since that is where the repeated pulling or jerking motion is applied. The failure is generally a tearing or breaking of the inner conduit (typically made of plastic, rubber or a rubberized material). In the hose assembly 100 of the present disclosure, the assembly is reinforced at the connector 250 with the ferrule 190 and the welded connection to the inner hose 110 and the outer hose 150. The arrangement of the hose assembly 100 of the current disclosure leads to substantial improvements in the long term durability of the hose assembly.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A hose assembly comprising:
   a) a bendable inner hose having a first length at rest in an unbended condition, a first end and a second end;
   b) a bendable outer hose having a second length at rest in an unbended condition, a third end and a fourth end;
   c) a ferrule;
   d) a delivery hose disposed within the bendable inner hose having a third length; and
   e) a connector slidably received on the outer bendable hose for attachment of the hose assembly to a fitting,
   wherein the first end of the inner hose and the third end of the outer hose are both attached to the ferrule,
   wherein the connector is freely rotatable relative to the bendable outer hose when attaching the hose assembly to the fitting,
   wherein the connector is slidably received directly upon the outer bendable hose for attachment of the hose assembly to a fitting, and
   wherein the connector further comprises a first opening to accommodate a fitting and a second opening, the second opening having a diameter that is larger than the diameter of the outer bendable hose and that is smaller than the diameter of a flange of the ferrule.

2. The hose assembly of claim 1, wherein the bendable inner hose is a hose spring.

3. The hose assembly of claim 1, wherein the bendable outer hose is a hose sheath.

4. The hose assembly of claim 1, wherein the ferrule has a body and a flange, and wherein first end of the inner hose is attached to the body of the ferrule and the third end of the bendable outer hose is attached to the flange of the ferrule.

5. The hose assembly of claim 4, wherein the fourth end of the bendable outer hose is attached to an outer surface of the bendable inner hose.

6. The hose assembly of claim 5, wherein the outer bendable hose is not attached to the inner bendable hose between the third and fourth ends.

7. The hose assembly of claim 1, wherein the ferrule is pre-assembled to the bendable inner hose.

8. The hose assembly of claim 7, wherein the ferrule is welded to the bendable inner hose.

9. The hose assembly of claim 1, wherein the bendable outer hose is unattached to the bendable inner hose between the first and second ends.

10. The hose assembly of claim 9, wherein the bendable outer hose is more flexible than the bendable inner hose.

11. The hose assembly of claim 1, further comprising a nozzle fixed to the ferrule.

12. The hoze assembly of claim 11, wherein water flows through the hose towards the ferrule and out the nozzle.

13. A hose assembly comprising:
   a) a bendable inner hose having a first length at rest in an unbended condition, a first end and a second end;
   b) a bendable outer hose having a second length at rest in an unbended condition, a third end and a fourth end; and
   c) a ferrule; and
   d) a connector slidably received on the outer bendable hose for attachment of the hose assembly to a fitting;
       wherein the first end of the inner hose and the third end of the outer hose are both attached to the ferrule, and
       wherein the connector further comprises a first opening to accommodate a fitting and a second opening, the second opening having a diameter that is larger than the diameter of the outer bendable hose and that is smaller than the diameter of a flange of the ferrule, and
       wherein the connector is freely rotatable relative to the bendable outer hose in an assembled configuration, and
       wherein the connector is slidably received directly upon the outer bendable hose for attachment of the hose assembly to a fitting.

\* \* \* \* \*